(12) United States Patent
Hasumi (10) Patent No.: US 6,972,503 B2
(45) Date of Patent: Dec. 6, 2005

(54) BRUSHLESS MOTOR

(75) Inventor: Takao Hasumi, Nagoya (JP)

(73) Assignee: Daido Tokushuko Kabushiki Kaisha, Nagoya (JP)

( * ) Notice: Subject to any disclaimer, the term of this patent is extended or adjusted under 35 U.S.C. 154(b) by 0 days.

(21) Appl. No.: 10/636,538

(22) Filed: Aug. 8, 2003

(65) Prior Publication Data

US 2004/0084985 A1 May 6, 2004

(30) Foreign Application Priority Data

| | | |
|---|---|---|
| Aug. 8, 2002 | (JP) | 2002-231659 |
| Aug. 8, 2002 | (JP) | 2002-231665 |
| Dec. 11, 2002 | (JP) | 2002-359008 |
| Jul. 25, 2003 | (JP) | 2003-202115 |
| Jul. 25, 2003 | (JP) | 2003-202116 |
| Jul. 29, 2003 | (JP) | 2003-203071 |

(51) Int. Cl.[7] .............................................. H02K 21/12
(52) U.S. Cl. .................................................. 310/156.43
(58) Field of Search ........................ 310/156.01–156.84

(56) References Cited

U.S. PATENT DOCUMENTS

| | | | | |
|---|---|---|---|---|
| 4,547,714 A | * | 10/1985 | Muller ........................ | 318/254 |
| 4,812,692 A | * | 3/1989 | Arita ......................... | 310/49 R |
| 5,220,228 A | | 6/1993 | Sibata ........................ | 310/156 |
| 5,652,470 A | | 7/1997 | von der Heide et al. ... | 310/156 |
| 5,757,100 A | | 5/1998 | Burgbacher ................. | 310/156 |
| 5,773,908 A | * | 6/1998 | Stephens et al. ............ | 310/254 |
| 6,104,117 A | * | 8/2000 | Nakamura et al. .......... | 310/254 |
| 6,242,837 B1 | * | 6/2001 | Matsunobu et al. ........ | 310/216 |
| 6,285,104 B1 | | 9/2001 | Nashiki ...................... | 310/184 |
| 6,713,921 B2 | * | 3/2004 | Sebastian et al. ...... | 310/156.38 |
| 2002/0003382 A1 | * | 1/2002 | Nakano et al. ........ | 310/156.47 |
| 2002/0047431 A1 | | 4/2002 | Fukushima | |

FOREIGN PATENT DOCUMENTS

| | | | |
|---|---|---|---|
| EP | 0 544 310 A2 | 6/1993 | ............ H02K/1/27 |
| EP | 1 257 039 A2 | 11/2002 | ............ H02K/1/27 |
| JP | 09-140104 | 5/1997 | .......... H02K/15/03 |
| JP | 10-178766 | 6/1998 | .......... H02K/15/02 |
| JP | 2000-134893 | 5/2000 | .......... H02K/21/22 |

OTHER PUBLICATIONS

Journal of the Japan Society of Mechanical Engineers 2002.1, V. 105, No. 998, p. 58.
Bianchi, Nicola, et al., "Design Techniques for Reducing the Cogging Torque in Surface–Mounted PM Motors", IEEE Transactions On Industry Applications, vol. 38, No. 5, Sep./Oct. 2002, pp. 1259–1265.
Hwang, Sang–Moon, et al., "Various Design Techniques to Reduce Cogging Torque by Controlling Energy Variation in Permanent Magnet Motors", IEEE Transactions On Magnetics, vol. 37, No. 4, Jul. 2001, pp. 2806–2809.

* cited by examiner

*Primary Examiner*—Darren Schuberg
*Assistant Examiner*—Nguyen Hanh
(74) *Attorney, Agent, or Firm*—Bacon & Thomas, PLLC (57) ABSTRACT

A brushless motor A includes a permanent magnet used as a rotor 1 that is driven by three-phase power supply, wherein the permanent magnet is magnetized by a trapezoidal magnetization, and the trapezoidal magnetization is applied such that a generation period of a cogging torque is set to almost half of the generation period of the cogging torque generated when the permanent magnet to which a square magnetization is applied is used. In this brushless motor A, preferably a skew magnetization is also applied to the rotor 1. Further, in case of driven by a sinusoidal-wave current, the skew angle is set to the angle in the range that has ±15% of the reference angle as an upper limit and a lower limit by a combination of a trapezoidal magnetization and a skew magnetization.

3 Claims, 13 Drawing Sheets

MAGNETIZATION INTENSITY CURVE FOR ONE POLE OF ROTOR SHOWN IN FIG. 2 FOR NON-ZERO $\alpha$

*FIG. 15*
*(PRIOR ART)*

BRUSHLESS MOTOR

BACKGROUND OF THE INVENTION

The present invention relates to a brushless motor and, more particularly, a brushless motor which is suitable for a motor, e.g., an EPS (Electric Power Assist Steering) motor, or the like, of which an extremely low cogging torque characteristic or an extremely low torque ripple is required.

In recent years, the electric power assist steering (abbreviated to "EPS" hereinafter) is observed with interest as the power steering that is applied to the car, etc. Since the EPS is able to omit the pump and the piping that are required of the hydraulic power steering and the energy is not consumed except the power assisting operation, the EPS can largely contribute improvement in the fuel consumption. Thus, such EPS is advantageous to achieve simplification of the mechanism and reduction in weight of the vehicle.

Figure 14:
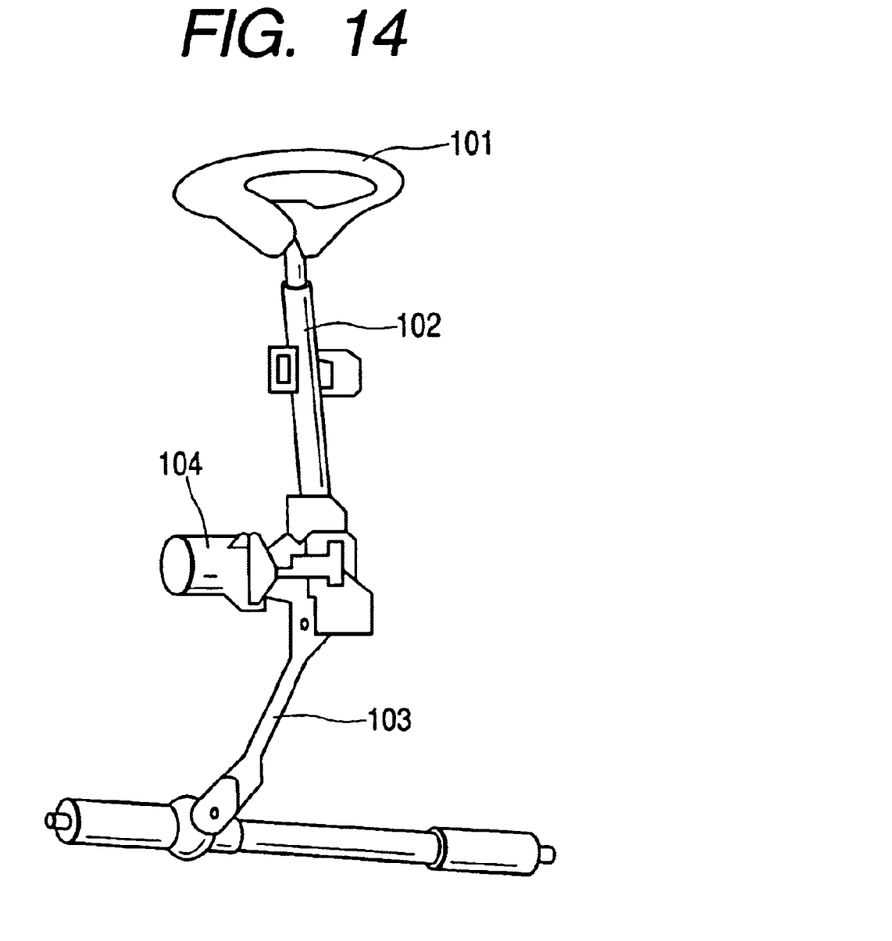
FIG. 14 is a schematic view showing a schematic configuration of EPS in the prior art.

An example of the EPS in the prior art is shown in FIG. 14. In this EPS, a motor 104 is provided to a connection portion between a column 102, which rotatably supports a steering wheel 101, and an intermediate shaft 103 such that an output of the motor 104 assists the steering operation by a force that responds to a vehicle speed. In such EPS, normally a rotating force of the motor is directly utilized as an assisting force of the steering operation. Therefore, the driver comes indirectly into contact with the rotating axis of the motor via the steering wheel, and thus an influence of a behavior of the motor on the steering feeling is large.

In such EPS, it is preferable that the torque ripple of the motor should be suppressed smaller than 1% or less not to affect the steering feeling (For example, see Journal of the Japan Society of Mechanical Engineers 2002.1, Vol. 105, No. 998, p. 58).

Then, in the prior art, because of such advantages that the torque ripple is small and the torque control is easily executed, the DC motor with the brush is used mainly as the driving source of EPS. However, since the EPS motor is arranged near the driver's seat, the noise generated by the motor becomes a problem when such motor with the brush is used.

Further, out of various characteristics in connection with the behavior of the motor, particularly the cogging torque is concerned with smoothness of the operation near the neutral position of the steering wheel, i.e., the straight line stability of the vehicle. Therefore, it is possible to say that there is great necessity to attain the high characteristic.

Then, it is also required to reduce the cogging torque to some extent by employing the skew-laminated core structure, skew-magnetizing the permanent magnet, or the like.

Therefore, the trial to suppress the torque ripple and the cogging torque is carried out by employing the brushless motor, which is excellent in the silence and the durability, and also employing the driving system using the sinusoidal-wave current in the EPS motor (not publicly known).

Here, as the measure for suppressing the torque ripple and reducing the cogging torque, the measure for applying the skew to the motor may be considered (For example, refer to JP-A-10-178766).

For example, the cogging torque can be reduced to some extent by employing the skew-laminated core structure, skew-magnetizing the permanent magnet, or the like.

However, the extent of reduction in the cogging torque, which is required of the EPS motor, is very high (for example, 1% or less of the rated output). Thus, it is difficult to reduce sufficiently the cogging torque by applying the skew to the motor.

Therefore, this measure is in such a dilemma that the torque ripple cannot be sufficiently reduced, if the skew angle is set to reduce the cogging torque, whereas the cogging torque cannot be sufficiently reduced in this case, if the skew angle is set to reduce the torque ripple.

As a consequence, in order to reduce sufficiently the cogging torque of the brushless motor, it is proposed that a magnetomotive force of the permanent magnet should be modified, for example (see JP-A-9-140104, JP-A-2000-134893, etc.). For example, it is proposed that the cogging torque should be reduced by adjusting a waveform of a magnetizing current that is applied to the permanent magnet (referred to as a "magnetizing waveform" hereinafter)

However, according to the simulation made by the inventor of the present invention, it is found that it is difficult for above proposals to reduce the cogging torque to the extent that is required of the EPS motor.

By the way, the detailed analysis of the magnetizing waveform, which minimizes the cogging torque, is not conventionally carried out. Thus, the theoretical or actual guideline that gives the optimum magnetizing waveform, which can minimize the cogging torque, through various stator shapes is not verified yet. Therefore, if the brushless motor is applied to the motor, e.g., the EPS motor, of which the extremely high cogging torque characteristic is required, the operation of searching the optimum magnetizing waveform in various stator shapes of the motor must be executed at random to reduce the cogging torque to the sufficient extent. As a result, such a problem is caused that such operation increases a cost when the brushless motor is applied to the EPS motor, for example.

SUMMARY OF THE INVENTION

The present invention is made in view of such problems in the prior art, and it is an object of the present invention to provide a brushless motor in which the cogging torque can be remarkably reduced.

Further, it is an object of the present invention to provide a brushless motor in which both the cogging torque and the torque ripple can be highly reduced, thereby an extremely smooth rotating output can be obtained, so that a rotation can be made extremely smooth both at the time of no power supply and at the time of power supply.

As the earnestly studied result of such problem, in the brushless motor employing a so-called permanent magnet, the inventor of the present invention is found that, if an inclination angle of the trapezoidal magnetization is being increased, the cogging torque is reduced and also a waveform of the cogging torque is deformed, so that a period of a waveform of the cogging torque by the trapezoidal magnetization with a certain inclination angle becomes almost half of a period of a waveform of the cogging torque by the square magnetization with no inclination or the trapezoidal magnetization with any inclination angle except the above certain inclination angle and, as a result, the cogging torque can be reduced to the extent that is required of the EPS motor. Therefore, the inventor of the present invention comes to complete the present invention.

In other words, there is provided a brushless motor of the present invention in which a permanent magnet is used as a rotor, wherein the permanent magnet is magnetized by a trapezoidal magnetization, and the trapezoidal magnetization is applied such that a generation period of a cogging torque is set to almost half of the generation period of the cogging torque generated when the permanent magnet to which a square magnetization is applied is used.

In the brushless motor of the present invention, preferably the magnetization is applied such that a peak value of a waveform of the cogging torque coincides substantially with each other.

Further, in the brushless motor of the present invention, preferably a skew magnetization is applied together. In such case, more preferably a skew angle is set within a range of ±5% of a reference angle.

A brushless motor of the present invention provides a brushless motor in which a permanent magnet is used as a rotor, a magnetization of the permanent magnet is applied to form a trapezoidal magnetization, and a magnetization-inclined range in the trapezoidal magnetization is set as follows.

$$\alpha = \beta \times r \times \theta_T$$

$$0.375 \leq r \leq 0.550$$

where α: magnetization-inclined range, $\theta_T$: 360 degree/(the least common multiple of the slot number and the magnet pole number), β: constant derived by dividing the least common multiple M of the magnet pole number $n_p$ and the slot number $n_s$ by two times of the slot number $n_s$ (β: β=M/2$n_s$), and multiple thereof, and r: cogging torque relational number.

A brushless motor of the present invention provides a brushless motor in which a permanent magnet is used as a rotor and a motor driving current waveform is a sinusoidal wave, and a magnetization of the permanent magnet is applied based on a combination of a trapezoidal magnetization and a skew magnetization.

In the brushless motor of the present invention, preferably a magnetization-inclined range in the trapezoidal magnetization is defined by a following inequality.

$$E < \alpha < F$$

where α: magnetization-inclined range,

E: (angle between the teeth)/2, and

F: 360 degree/{(pole number of the stator)×2}.

Further, in the brushless motor of the present invention, preferably a skew angle of the skew magnetization is set in a range of ±15% of a reference angle.

Since the brushless motor of the present invention is constructed as described above, the torque ripple and the cogging torque can be reduced to the extent that is applicable to the EPS motor.

Since the brushless motor of the present invention is constructed as described above, both the cogging torque and the torque ripple can be highly reduced. Therefore, the extremely smooth rotating output can be obtained and also the rotation can be made extremely smooth at the time of no power supply.

DETAILED DESCRIPTION OF THE PREFERRED EMBODIMENTS

The present invention will be explained based on embodiments with reference to the accompanying drawings hereinafter. However, the present invention is not limited only to such embodiments.

Figure 1:
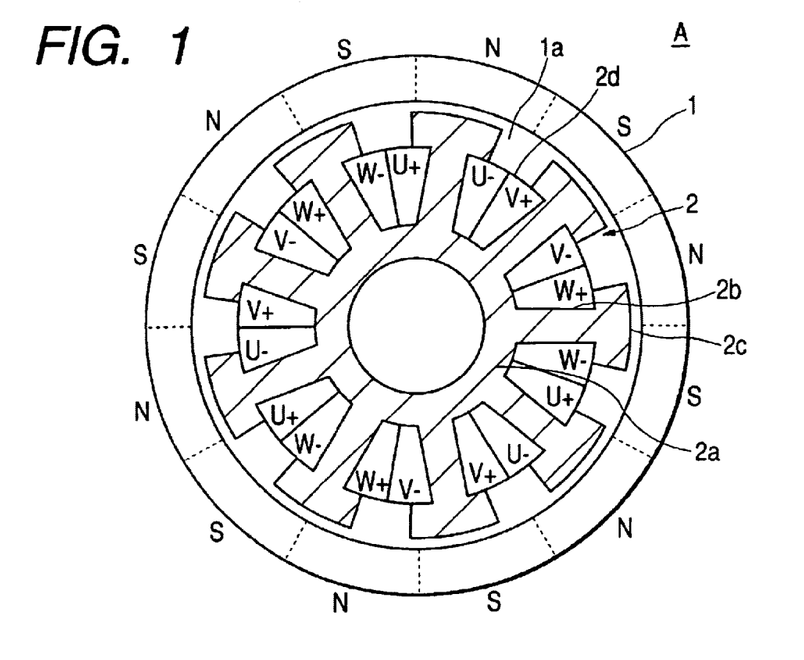
FIG. 1 is a schematic cross sectional view showing a brushless motor according to an Embodiment of the present invention.
Figure 2:
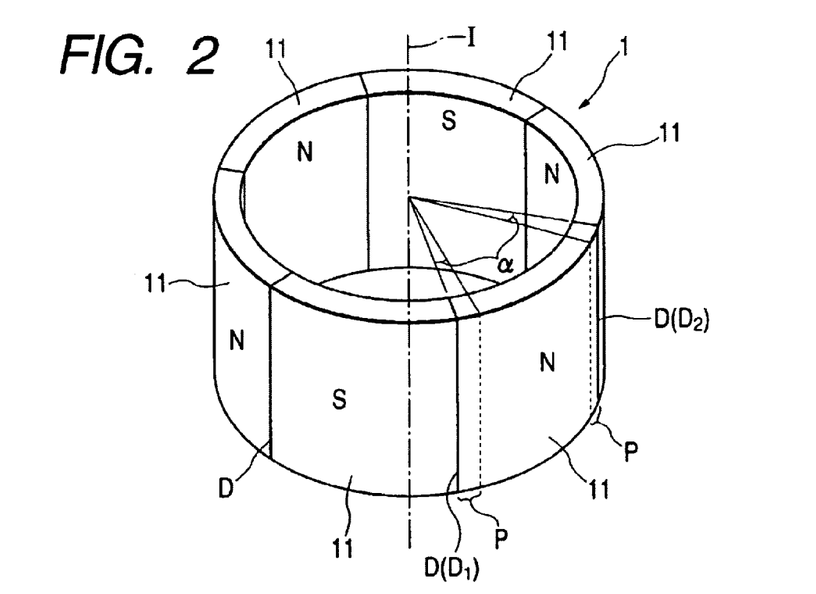
FIG. 2 is a schematic view showing details of a rotor of this motor and showing a mode of a trapezoidal magnetization.
Figure 3:
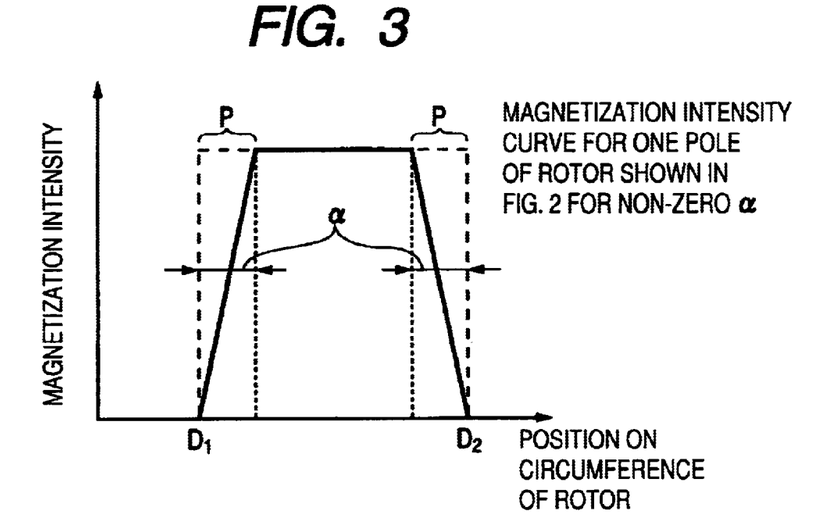
FIG. 3 is a graph showing a relationship between a circumferential position and an intensity of magnetization in a magnetic pole of the rotor.

A schematic configuration of a brushless motor according to an embodiment of the present invention is shown in FIGS. 1, 2 and 3.

A cross sectional view of the brushless motor (referred simply to as the "motor" hereinafter) is shown in FIG. 1. This motor A is an outer rotor motor that has a rotor 1 constructed by a cylindrical permanent magnet and a stator 2 arranged in a hollow portion 1a.

The stator 2 is constructed by laminating a steel plate having a predetermined shaped up to the required number of sheets or by dust core. This stator has a cylindrical stator yoke 2a, nine stator necks 2b, 2b, ... provided radically on an outer peripheral surface of the stator yoke 2a in the circumferential direction at a predetermined interval, e.g., at a pitch of 40°, and stator teeth 2c, 2c, ... formed at respective top ends of the stator necks 2b, 2b .... Driving coils 2d, 2d, 2d ... are wounded round the stator necks 2b, 2b, ... respectively.

The driving coils 2d, which is called as Concentrated Stator Windings, consist of three-phase driving coils, i.e., U-phase driving coils 2dU, V-phase driving coils 2dV, and W-phase driving coils 2dW. These driving coils are wound round the stator necks $2b, 2b, \ldots$ clockwise in FIG. 1 in such a manner that the V-phase driving coil 2dV is positioned next to the U-phase driving coil 2dU, the W-phase driving coil 2dW is positioned next to the V-phase driving coil 2dV, and the U-phase driving coil 2dU is positioned next to the W-phase driving coil 2dW.

Details of the rotor 1 are shown in FIG. 2. As shown in FIG. 2, the rotor 1 is constructed in such a manner that respective magnetic poles 11 consisting of the N pole and the S pole, which are formed like an equal-width stripe respectively, are arranged alternatively in the circumferential direction. This rotor 1 is formed by shaping various permanent magnets including the ferrite magnet, the Alnico magnet, the Sm—Co magnet, the rare earth-Fe magnet, etc. into a cylindrical body.

As shown in FIG. 3, in the magnetic pole 11 of the rotor 1, an intensity of magnetization is set to change like a trapezoidal shape from one end ($D_1$) to the other end ($D_2$) in the circumferential direction. In other words, a portion P in which an intensity of magnetization (magnetomotive force) is changed linearly within a predetermined range portion from a boarder line D between neighboring magnetic poles 11 on both sides (referred to as a "magnetization-inclined portion" hereinafter) is provided to the magnetic pole 11 of the rotor 1.

At this time, in a relationship between a range, in which the magnetization-inclined portion P given by a following equation (1) is provided (represented by an angle α round the center axis I of the rotor 1, and referred to as a "magnetization-inclined range" hereinafter), and 360 degree/(the least common multiple of the slot number and the magnet pole number) $\theta_T$, it is found out by the independent inspection made by the inventor of the present invention that, if a cogging torque relational number r is set to a value within a range given by a following inequality (1), the cogging torque of the motor A can be remarkably reduced.

$$\alpha = \beta \times r \times \theta_T \quad (1)$$

where β: a constant derived by dividing the least common multiple M of the magnet pole number $n_p$ and the slot number $n_s$ by two times of the slot number $n_s$ ($\beta: \beta = M/2n_s$), and multiple thereof.

$$0.375 \leq r \leq 0.550 \quad (2)$$

In other words, if the magnetization-inclined range a is set such that the cogging torque relational number r is set to a value of 0.375 or more and 0.550 or less in the above equation (1), the cogging torque of the motor A can be remarkably reduced in various brushless motors, which have the magnet pole number $n_p$, the slot number $n_s$, and 360 degree/(the least common multiple of the slot number and the magnet pole number) $\theta_T$, to the extent that such motor can be applied as the EPS motor, for example. More preferably, the cogging torque relational number is 0.375 or more and 0.425 or less.

In other words, the cogging torque of 1% or less of the rated torque (about 0.1% in Embodiments 1 and 2), which is required of the EPS motor, can be achieved easily.

Further, since the motor A is constructed as the brushless motor, it is easy to attain the stillness that is required of the EPS motor arranged near the driver's seat.

In this case, in the above inequality (1), a product R (=r×β) of the cogging torque relational number r and the constant β indicates a rate of the magnetization-inclined range α to 360 degree/(the least common multiple of the slot number and the magnet pole number) $\theta_T$. Therefore, this product R is called a magnetization-inclined range rate in the present specification.

Figure 7:
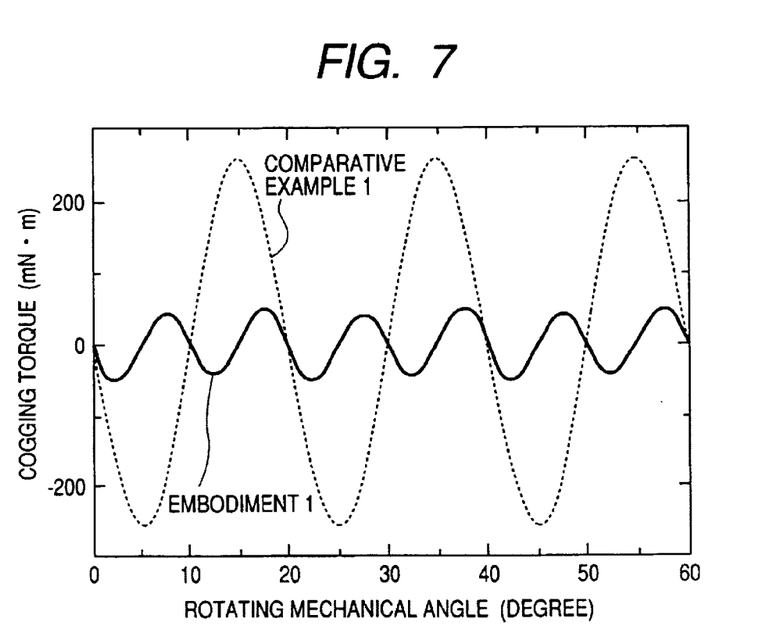
FIG. 7 is a graph showing cogging torque characteristics of the same.
Figure 8:
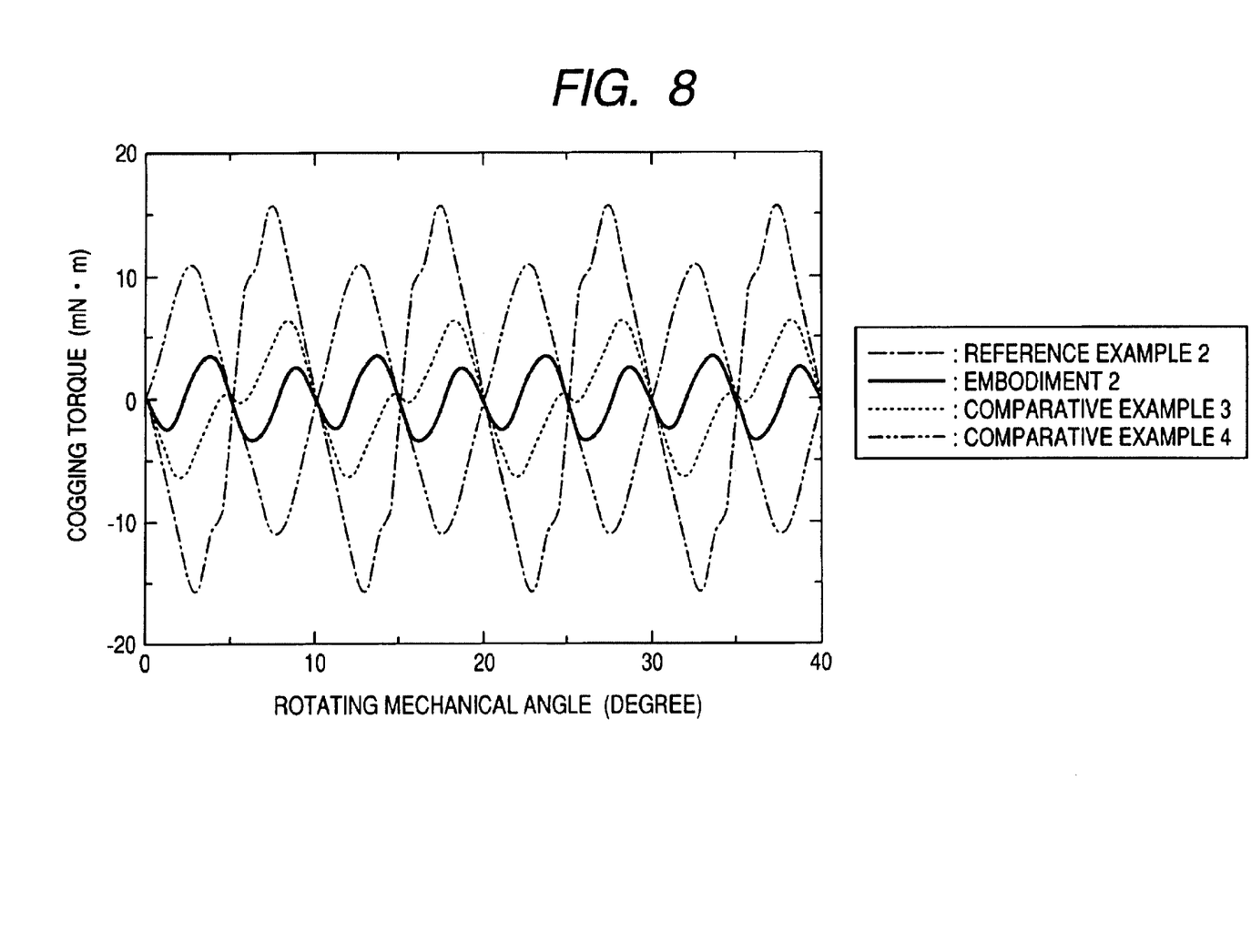
FIG. 8 is a graph showing a relationship between a rotating mechanical angle and the cogging torque in the 12-pole 9-slot motor in respective Embodiments.
Figure 15:
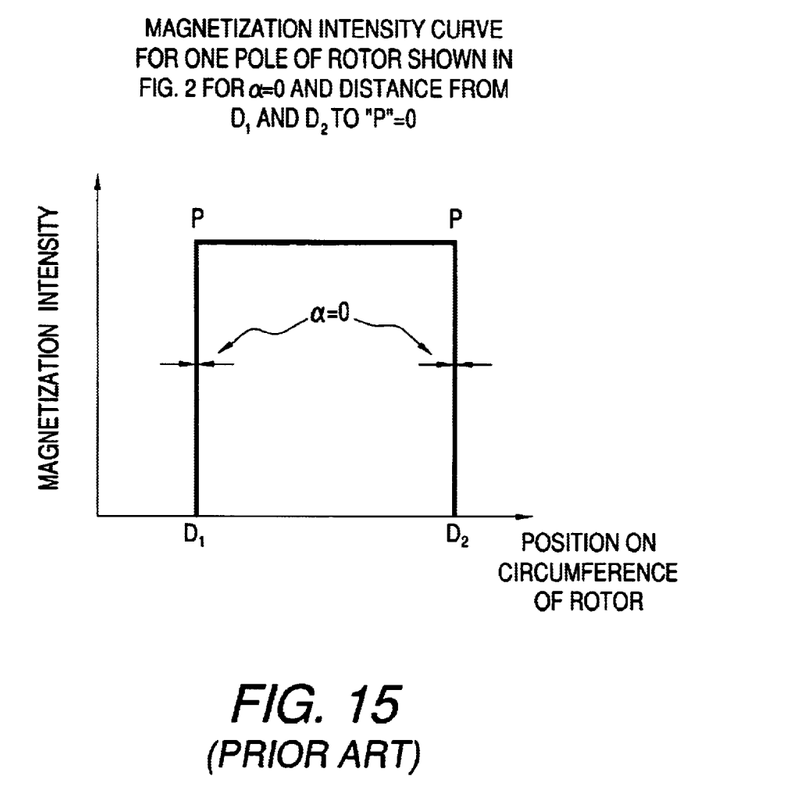
FIG. 15 is a graph showing a relationship between a circumferential position and an intensity of magnetization in a magnetic pole of the rotor of FIG. 2, for the conventional uniform magnetization arrangement in which α is zero and the magnetization curve for each pole is accordingly square.

Here, in the case that the motor is the 6-pole 9-slot type motor, if the magnetization-inclined range α in the trapezoidal magnetization is set to 15 degrees within the range that satisfies the above expressions (1) (2), a cogging torque generation period can be reduced to half of a cogging torque generation period obtained when the magnetization-inclined range α is set to 0 degrees, i.e., in case the uniform or "square" magnetization and also a peak value coincide substantially with each other, as shown in Embodiments 1 and 2 described below in connection with FIGS. 7 and 8. FIG. 15 is a graph of the magnetization intensity across one of the poles of a motor identical in structure to that of FIG. 2, but in which the magnetization-inclined range (and distance to position P) is zero as in a conventional permanent magnet rotor, such that the magnetization intensity is uniform between points D1 and D2, and the graph of magnetization intensity to distance from the pole boundary (FIG. 15) is square.

Figure 4:
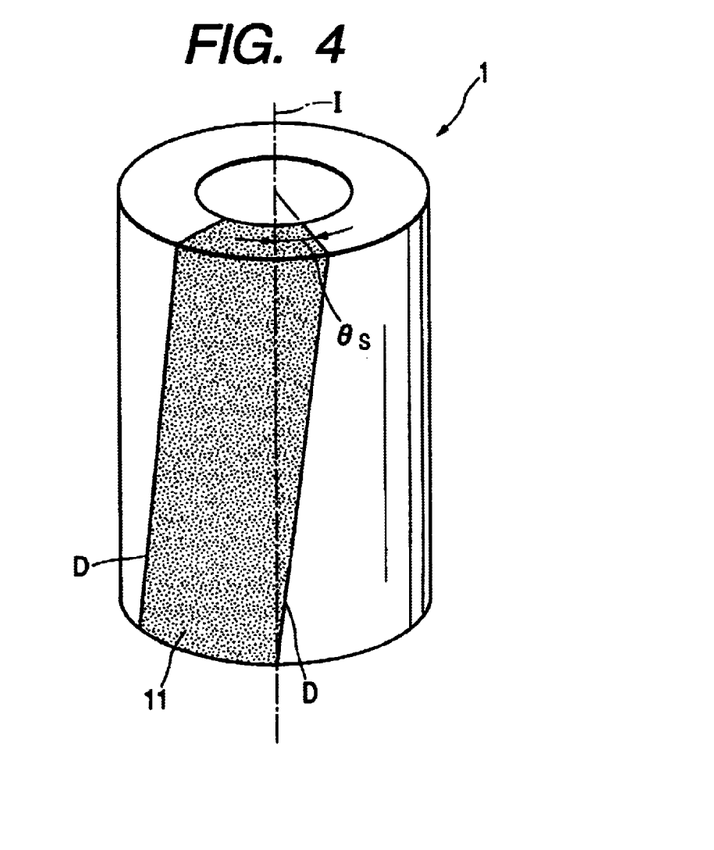
FIG. 4 is a schematic view showing details of the rotor of this motor and showing a mode of a skew magnetization.

Further, as shown in FIG. 4, the magnetic pole 11 of the rotor 1 is formed to have a skew at a predetermined angle $\theta_s$. This angle (also referred to as a "skew angle" hereinafter) $\theta_s$ is set to further reduce the cogging torque under the condition that the magnetization-inclined range α is set to satisfy the above expressions (1)(2). In particular, the skew angle $\theta_s$ is set on the basis of ½ of an angle that is obtained by dividing 360 degree by the least common multiple M of the pole number of the stator 2 and the pole number of the rotor 1 (referred to as a "reference angle" hereinafter). More particularly, the skew angle $\theta_s$ is set as an angle within a range whose upper limit and lower limit are set to ±5% of the reference angle. Here, the reason why the upper limit and the lower limit are set as above is that the optimum skew angle, at which the skew magnetization effect as the effect of averaging the magnetization in the height direction is increased, is varied due to the leakage of the magnetic flux from upper and lower ends of the magnet and the magnetic force distribution of the magnet itself, and therefore such variation must be covered within this range. Now, such variation in this range is present in all the existing magnets that are commercially available.

In this case, in place of the provision of the skew to the magnetic pole 11, the skew may be provided to the tooth portions 2c of the stator 2. Further, the skew may be provided to both the magnetic pole 11 and the tooth portions 2c.

Figure 5:
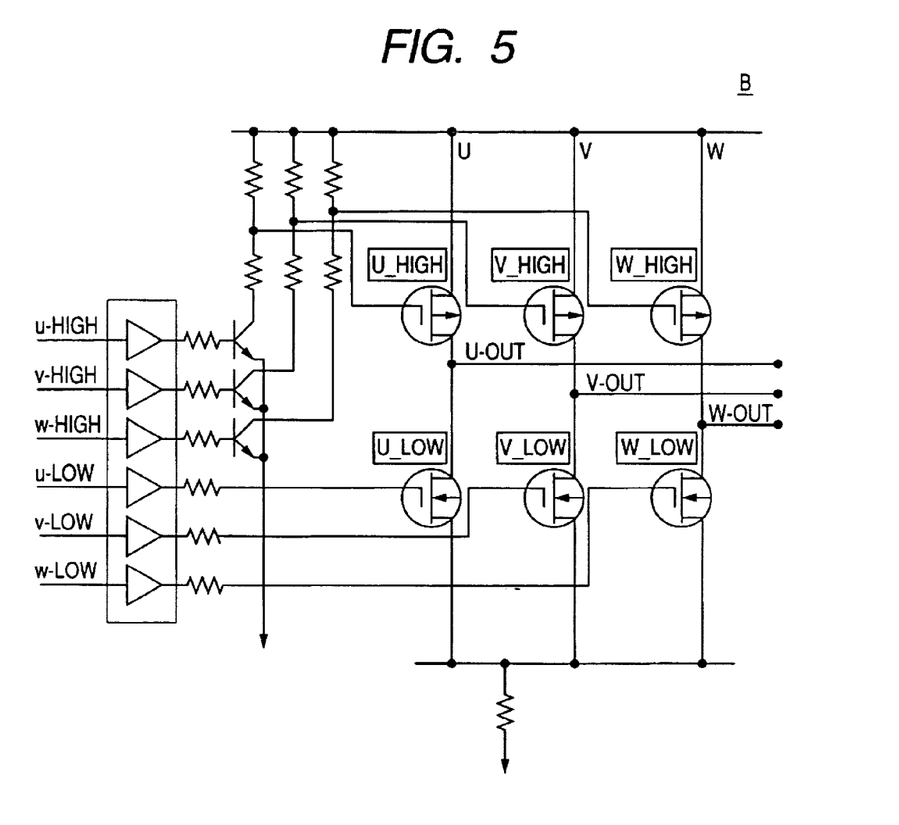
FIG. 5 is a circuit diagram showing an example of a driving circuit that is applicable to the brushless motor of the present invention.

An example of a circuit diagram of a driving circuit of the motor A is shown in FIG. 5. This driving circuit B is constructed as a driving circuit for a three-phase (U, V, W) brushless motor that drives the motor A by the so-called sinusoidal-like current.

In the motor A in the embodiment as in this fashion, the magnetization-inclined portion P is provided to both ends of the magnetic pole 11 of the rotor 1 in the predetermined range α to reduce both the torque ripple and the cogging torque, and also the skew magnetization is applied to the rotor 1 (permanent magnet) at the predetermined angle $\theta_s$ to reduce the cogging torque while suppressing the torque ripple.

As a result, when the motor A is applied to the EPS (Electric Power Assist Steering), the torque ripple and the cogging torque can be reduced sufficiently and thus the influence of the torque ripple and the cogging torque on the steering feeling can be eliminated sufficiently, as shown in Embodiment 3 described later.

In other words, in the conventional brushless motor whose application as the EPS motor is considered, normally the torque ripple is in excess of 7% and the cogging torque is in excess of 2% (ratios to the rated torque). In contrast, in the motor A in the embodiment, the torque ripple and the cogging torque of 1% or less, which is sufficient for the application to the EPS, can be achieved easily.

Therefore, though the special control such as the robust control by which the current waveform is input to cancel the torque ripple, for example, is not incorporated into the drive control of the motor A, the influence of the torque ripple can be relaxed. (In this case, actually it is difficult to eliminate sufficiently the influence of the torque ripple by the robust control, or the like)

Further, since the motor A is constructed as the brushless motor, it is easy to attain the stillness that is required of the EPS motor arranged near the driver's seat.

At this time, a range $\alpha$ in which the magnetization-inclined portion P is provided (represented by an angle round the center axis I of the rotor 1, and referred to as a "magnetization-inclined range" hereinafter) is set to an angle that is within a range given by a following inequality (3).

$$E < \alpha < F \qquad (3)$$

Where E: (angle between the teeth)/2, and

F: 360 degree/{(pole number of the stator)×2}.

As a result, the harmonic component of the induced voltage can be reduced and the waveform comes closer to an ideal sinusoidal wave, so that the torque ripple can be reduced sufficiently. That is, this is because the torque ripple becomes smallest when both the driving current and the induced voltage of the motor A come close to the sinusoidal waveform.

Here, the $\alpha$ value obtained when a relative harmonic content $\gamma$ (refer to embodiments described later) is reduced mostly is changed in the range given by the inequality (3) in response to the shape of the stator 2.

Further, as shown in FIG. 4, the magnetic pole 11 of the rotor 1 is formed to have a skew of a predetermined angle $\theta_s$. This angle (also referred to as a "skew angle" hereinafter) $\theta_s$ is set based on a predetermined standard such that the cogging torque is mostly reduced under the condition that the magnetization-inclined range $\alpha$ is set to satisfy the above inequality (3). In other words, the skew angle $\theta_s$ is set on the basis of an angle that is derived by dividing 360 degree by the least common multiple M of the pole number of the stator 2 and the pole number of the rotor 1 (referred to as a "reference angle" hereinafter). More particularly, the skew angle $\theta_s$ is set to the angle in the range that has ±15% of the reference angle as an upper limit and a lower limit respectively.

In this case, in place of the provision of the skew to the magnetic pole 11, the skew may be provided to the teeth portion 2c of the stator 2. Further, the skew may be provided to the magnetic pole 11 and the teeth portion 2c. In addition, the skew angle $\theta_s$ may be set on the basis of an angle that is an integral multiple of the reference angle.

An example of a driving circuit of the motor A is shown in FIG. 5. This driving circuit B is constructed as a three-phase (U, V, W) brushless motor driving circuit that drives the motor A by a sinusoidal-like current to reduce sufficiently the torque ripple in the motor A.

In this manner, in the motor A in the present embodiment, the magnetization-inclined portion P in the predetermined range $\alpha$ is provided to both ends of the magnetic pole 11 of the rotor 1 to reduce the torque ripple, and also the skew magnetization is applied to the rotor 1 (permanent magnet) at the predetermined angle $\theta_s$ to reduce the cogging torque.

Embodiments of the present invention will be explained with reference to the drawings hereinafter.
(Embodiment 1)

Figure 6:
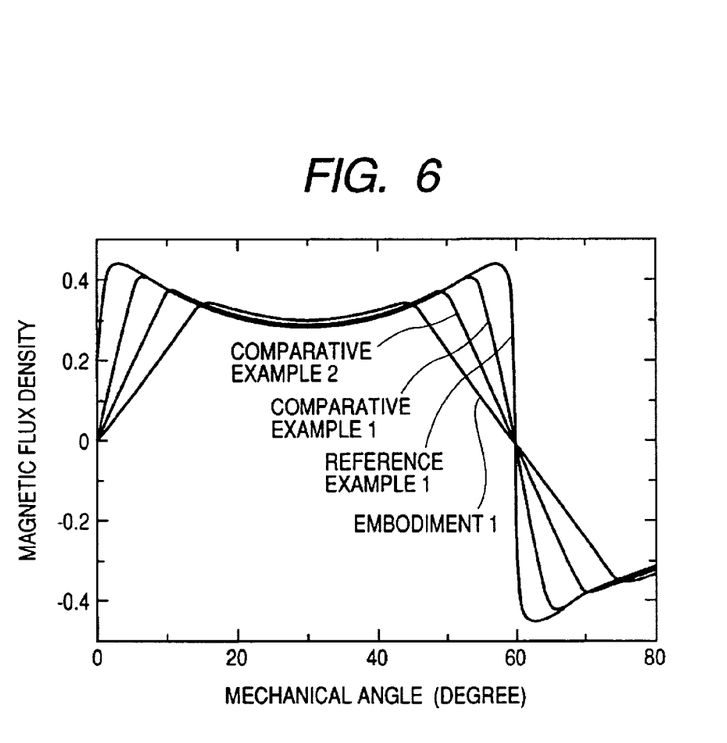
FIG. 6 is a graph showing a surface magnetic flux density distribution in the 6-pole 9-slot motor in respective Embodiments.

In the 6-pole 9-slot brushless motor ($\theta_T$=20 degree, $\beta$=2, referred to as the "first example motor" hereinafter) whose rotor (magnet) 1 has an inner diameter: Φ32, an outer diameter: Φ38, and Nd—Fe—B type radially oriented magnet, when the magnetization-inclined range rate R of the magnetic pole 11 (here R=2r) is set to various values, i.e., 0% (Reference Example 1), 25% (Comparative Example 1), 50% (Comparative Example 2) and 75% (Embodiment 1), simulation results of a surface magnetic flux density distribution (a calculated position is Φ38.4) are shown in FIG. 6. The cogging torque characteristics in Comparative Example 1 and Example 1 are shown in FIG. 7. In this case, the skew magnetization is not applied to the motor of Embodiment 1.

In FIG. 6, an abscissa denotes an angle (degree) round the center axis I by using one end $D_1$ (see FIG. 2) of the magnetic pole 11 as a basic point, while an ordinate denotes a surface magnetic flux density of the magnetic pole 11 at a corresponding angular position. In FIG. 7, an abscissa denotes a rotating angle of the rotor 1, while an ordinate denotes the cogging torque at a corresponding angular position.

As shown in FIG. 7, when the magnetization-inclined range rate R is set to 25% (Comparative Example 1), i.e., the magnetization-inclined range $\alpha$ is set to the completely inappropriate value, the cogging torque of about 230 mN·m is generated at maximum in the motor of Embodiment 1 in forward-reverse rotating directions respectively.

In contrast, in the motor of Embodiment 1, when the cogging torque relational number r is set to 75% that satisfies the condition given by the above inequality (2) (Embodiment 1), the magnetization-inclined range a is set appropriately. Therefore, it is appreciated that the cogging torque is remarkably suppressed and the peak value coincides substantially with each other.

As a result, it is possible to say that, if the magnetization-inclined range $\alpha$ is set to satisfy the condition given by the above inequality (2), the cogging torque can be suppressed to such an extent that this motor of Embodiment 1 can be applied as the EPS motor.
(Embodiment 2)

In the 12-pole 9-slot brushless motor ($\theta_T$=10 degree, $\beta$=2, referred to as the motor of Embodiment 2 hereinafter) whose rotor (magnet) 1 has an inner diameter: Φ32, an outer diameter: Φ38, and Nd—Fe—B type radially oriented magnet, a relationship between the rotating mechanical angle and the cogging torque is shown in FIG. 8 while using the magnetization-inclined range $\alpha$ of the magnetic pole 11 as a parameter.

In FIG. 8, in Embodiment 2, the magnetization-inclined range $\alpha$ is set to 8.0 degree (the magnetization-inclined range rate R=80.0%, the cogging torque relational number r=40%). In Comparative Example 3, the magnetization-inclined range $\alpha$ is set to 7.0 degree (the magnetization-inclined range rate R=70.0%, the cogging torque relational number r=35%).

In Comparative Example 4, the magnetization-inclined range $\alpha$ is set to 11.2 degree (the magnetization-inclined range rate R=112.0%, the cogging torque relational number r=56.0%). In Reference Example 2, the magnetization-inclined range $\alpha$ is set to 0 degree (both the magnetization-inclined range rate R and the cogging torque relational number r are 0%).

As shown in FIG. 8, in the motor of Embodiment 2, it is found that the waveform of the cogging torque is deformed as the magnetization-inclined range α is increased, and also, in Example 2 in which the magnetization-inclined range α is set to 8.0 degree, the cogging torque has the minimum value, the period is reduced to almost half of the period in Reference Example 2 in which the magnetization-inclined range α is set to 0 degree, and the peak value coincides substantially with each other. Further, in Comparative Example 3 and Comparative Example 4 in which the condition given by the above inequality (2) is not satisfied, it is found that the cogging torque is increased.

Figure 9:
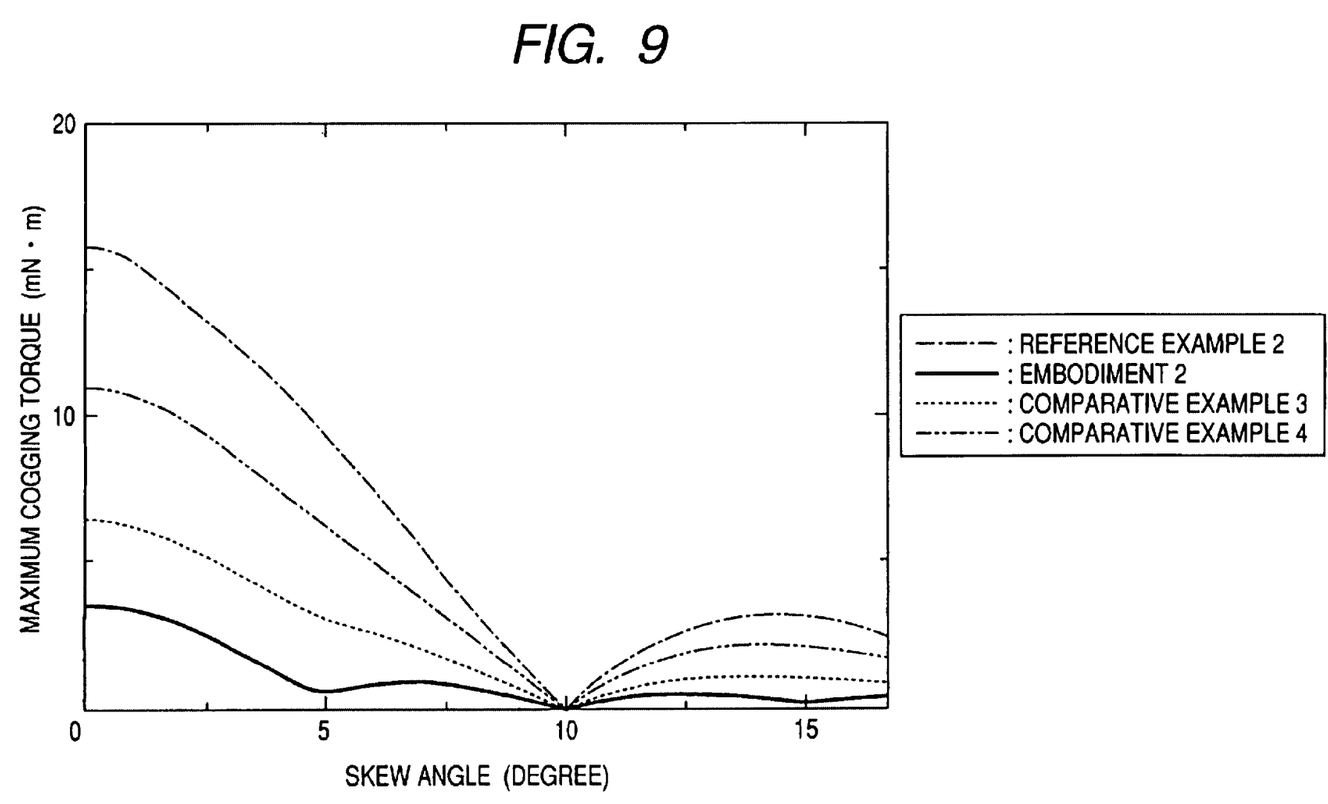
FIG. 9 is a graph showing a relationship between a skew angle and a maximum cogging torque in the same motor in respective Embodiments.

A relationship between the skew angle and the maximum cogging torque in the motor of Embodiment 2 is shown in FIG. 9.

As shown in FIG. 9, in the motor of Embodiment 2, in all Example 2, Comparative Example 3 to Comparative Example 4, and Reference Example 2, it is found that the maximum cogging torque becomes zero at an angle that is obtained by dividing 360 degree by the least common multiple 36 of the pole number and the slot number, i.e., 10 degree (theoretical angle). Further, in Embodiment 2, it is found that the maximum cogging torque is minimized at an angle that is half of the theoretical angle, i.e., 5 degree.

(Embodiments 3 to 5)

Figure 10:
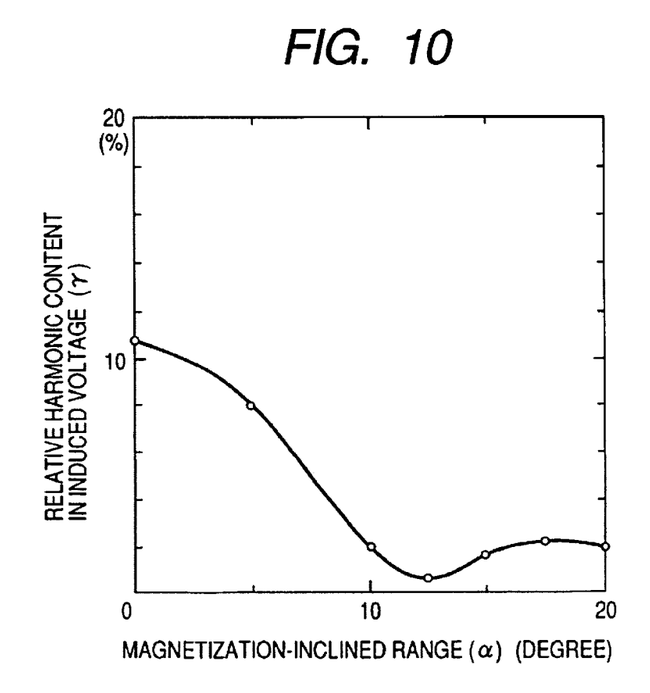
FIG. 10 is a graph showing a relationship between a magnetization-inclined range and a relative harmonic content in an induced voltage in the present motor.

When a trapezoidal wave as the magnetization waveform of a magnet rotor is applied to the 6-pole 9-slot type brushless motor (referred to as a motor of embodiment hereinafter, and the above least common multiple M is 18), a relationship between the magnetization-inclined range α and the relative harmonic (5-th harmonic) content γ in the induced voltage in measured results is shown in FIG. 10. Here, the case where the skew angle $\theta_s$ is set to 10 degree is shown.

Generally speaking, when a motor driving current waveform is a sinusoidal wave, it is possible to reduce a torque ripple upon driving a motor by reducing a component of relative harmonic of the induced voltage.

As in this embodiment, since the 3-rd harmonic is cancelled upon driving at three-phase, if the 5-th harmonic of which amplitude is the largest is low, the torque ripple becomes small.

Figure 11:
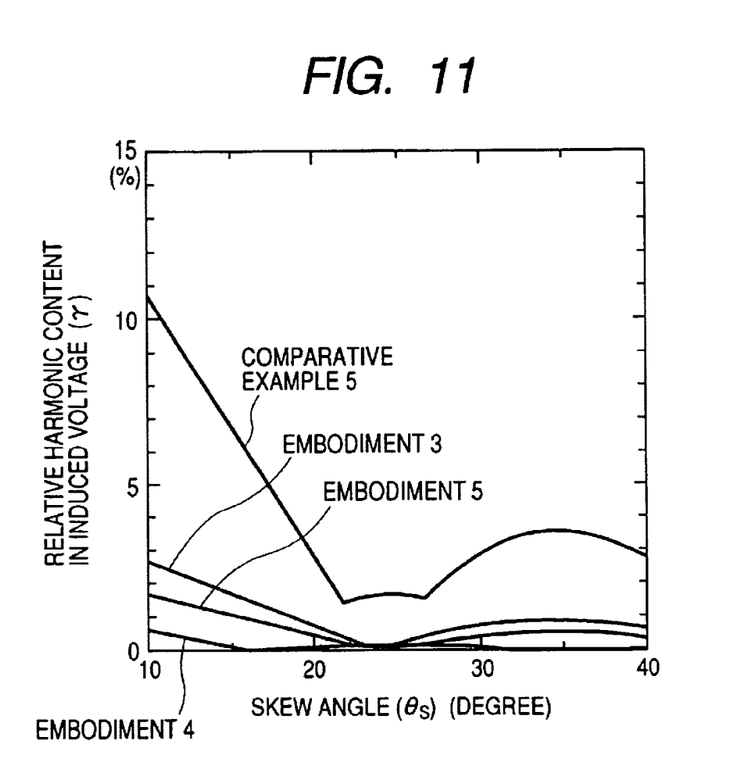
FIG. 11 is a graph showing a relationship between a skew angle and the relative harmonic content in the induced voltage in an Embodiment of the present invention.

When the magnetization-inclined range α is set to respective values of 10 degree (Embodiment 3), 12.5 degree (Embodiment 4), and 15 degree (Embodiment 5), a relationship between the skew angle $\theta_s$ and the relative harmonic content γ is shown in FIG. 11. Further, the case where no inclination of the magnetization is applied is shown together in FIG. 11 as Comparative Example 5.

Figure 12:
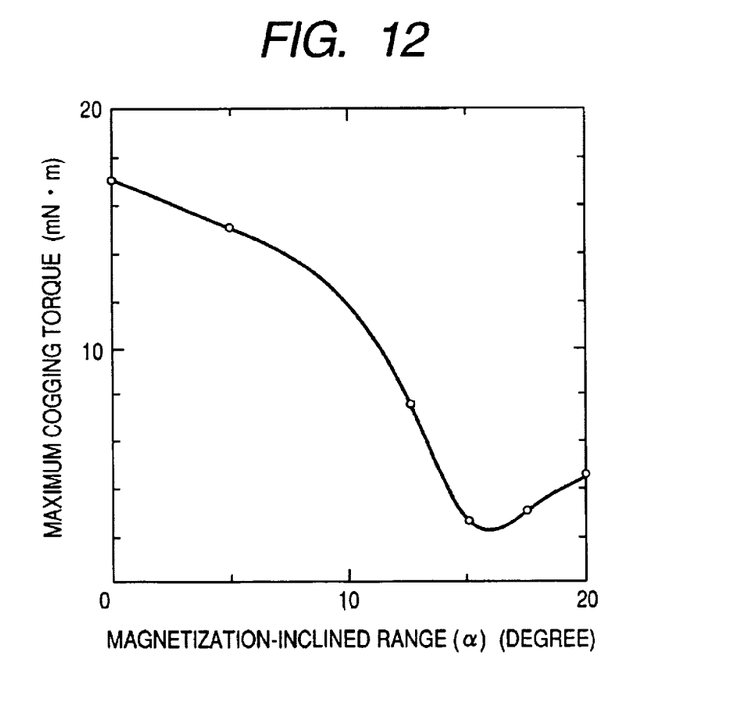
FIG. 12 is a graph showing a relationship between the magnetization-inclined range and a maximum cogging torque in the present motor.

A relationship between the magnetization-inclined range α and the maximum cogging torque is shown in FIG. 12. Here, the case where no skew magnetization is applied is shown.

Figure 13:
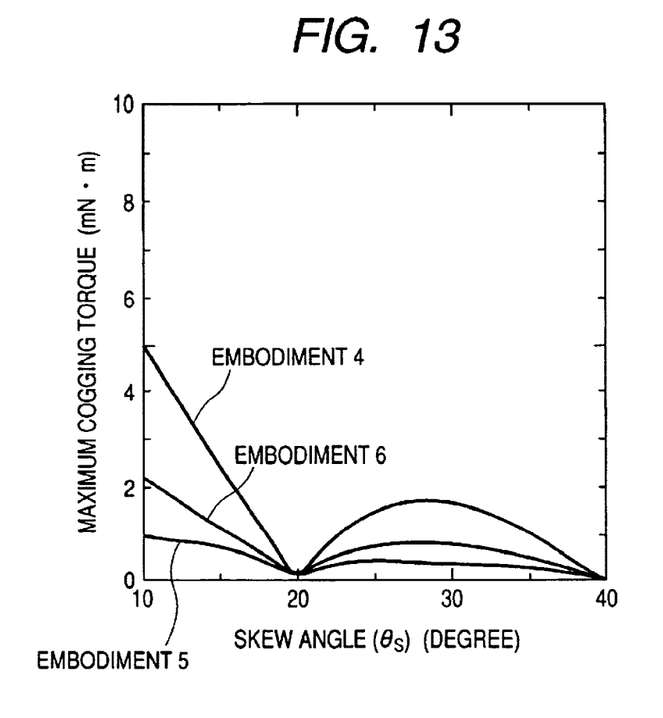
FIG. 13 is a graph showing a relationship between the skew angle and the maximum cogging torque in the Embodiment of the present invention.

When the magnetization-inclined range α is set to respective values of 12.5 degree (Embodiment 4), 15 degree (Embodiment 5), and 17.5 degree (Embodiment 6), a relationship between the skew angle $\theta_s$ and the maximum cogging torque is shown in FIG. 13.

As shown in FIG. 10, when the value α is set to 12.5 degree, the relative harmonic content γ is minimized. In other words, when the magnetization-inclined range α is set to 12.5 degree, the induced voltage comes closest to the sinusoidal wave and thus the torque ripple can be minimized.

Further, as shown in FIG. 11, in all Embodiments 3, 4 and 5, because the relative harmonic content γ can be minimized around the skew angle $\theta_s$ of 23 degree to 27 degree, the torque ripple become minimum at that angle. In this case, in Example 4 in which the value α is set to 12.5 degree, the torque ripple can be suppressed smaller than 1% or less in the overall range of the skew angle $\theta_s$ from 10 degree to 40 degree. In other words, when a width α of the magnetization-inclined portion is set to 12.5 degree, a dependency of the relative harmonic content γ on the skew angle $\theta_s$ becomes small and thus it becomes easy to suppress the relative harmonic content γ.

As shown in FIG. 12, when the magnetization-inclined range α is set to about 15 degree (Embodiment 5 in FIG. 13), the maximum cogging torque is minimized.

As shown in FIG. 13, in all Embodiments 4, 5 and 6, when the skew angle $\theta_s$ is set to 20 degree (=360 degree÷M(=18)), the maximum cogging torque is minimized.

With the above, the present invention is explained with reference to the embodiment. However, the present invention is not limited only to such embodiment, and various modifications and variations can be applied. For example, the so-called 6-pole 9-slot motor is used in the embodiment, but the application of the present invention is not limited to the 6-pole 9-slot motor and the present invention can be applied to various brushless motors. Further, the outer rotor motor is used in the embodiment, but the inner rotor motor may be used.

As described in detail above, according to the brushless motor of the present invention, such an excellent advantage can be obtained that the cogging torque and the torque ripple can be reduced within a range that can be applied to the EPS motor.

Further, according to the brushless motor of the present invention, such excellent advantages can be obtained that both the cogging torque and the torque ripple can be highly reduced, so that the extremely smooth rotating output can be obtained and also the rotation can be made extremely smooth at the time of no power supply.

What is claimed is:

1. A brushless motor comprising:

a stator, and a permanent magnet used as a rotor, wherein the permanent magnet includes a plurality of magnetic poles having alternating polarity, wherein an intensity of magnetization increases from zero to a predetermined maximum over a magnetization-inclined range extending from respective boundaries of each pole to a circumferential position P situated a non-zero distance from the respective boundaries, and is constant over a remaining portion of each pole such that a graph of magnetic intensity versus distance from a boundary of a respective pole forms a trapezoidal shape, and wherein the magnetization-inclined range is set as $$\alpha = \beta \times r \times \theta_T$$

$$0.375 \leq r \leq 0.550$$

where α: magnetization-inclined range, $\theta_T$: 360 degree/(the least common multiple of the slot number and the magnet pole number);

β: constant derived by dividing the least common multiple M of the magnet pole number $n_p$ and the slot number $n_s$ by two times the slot number $n_s$ (β:β=M/2$n_s$), and multiple thereof, and r: cogging torque relational number.

2. A brushless motor in which a motor driving current waveform is a sinusoidal wave, comprising:

a stator, and a permanent magnet used as a rotor, wherein the permanent magnet includes a plurality of magnetic poles having alternating polarity, wherein an intensity of magnetization increases from zero to a predetermined maximum over a magnetization-inclined range extending from respective boundaries of each pole to a circumferential position P situated a non-zero distance from the respective boundaries, and is constant over a remaining portion of each pole such that a graph of magnetic intensity versus distance from a boundary of a respective pole forms a trapezoidal shape, the distance P across which said magnetization intensity increases varies between ends of said boundaries to form a skew magnetization, and said magnetization-inclined range in the trapezoidal magnetization is defined by a following inequality:

$$<\alpha<F$$

wherein $\alpha$: magnetization-inclined range,

E: (angle between teeth extending from the stator)/2, and

F: 360 degree/{(pole number of the stator)×2}.

3. The brushless motor according to claim 2, wherein a skew angle is set within a range of ±15% of a reference angle.

* * * * *